United States Patent [19]

Eipper et al.

[11] Patent Number: 5,393,111
[45] Date of Patent: Feb. 28, 1995

[54] BUMPER ASSEMBLY FOR A MOTOR VEHICLE

[75] Inventors: Konrad Eipper, Ammerbuch; Gerd Gutenberger, deceased, late of Pfalzgrafenweiler; Thomas Gutenberger, heir, Nagold; Georg Partusch, Geltendorf, all of Germany

[73] Assignee: Mercedes-Benz AG, Stuttgart, Germany

[21] Appl. No.: 148,275

[22] Filed: Nov. 8, 1993

[30] Foreign Application Priority Data

Nov. 7, 1992 [DE] Germany .................. 4237707

[51] Int. Cl.6 ........................................ B60R 19/22
[52] U.S. Cl. .................................. 293/109; 293/120; 293/155
[58] Field of Search .............. 293/102, 107, 109, 110, 293/132, 134, 136, 120, 121, 155

[56] References Cited

U.S. PATENT DOCUMENTS

| 4,109,951 | 8/1978 | Weller | 293/155 X |
|---|---|---|---|
| 4,278,282 | 7/1981 | Roubinet et al. | 293/132 |
| 4,457,547 | 7/1984 | Sekiyama et al. | 293/110 |
| 4,925,224 | 5/1990 | Smiszek | 293/120 |
| 4,941,701 | 7/1990 | Loren | 293/109 X |
| 5,265,925 | 11/1993 | Cox et al. | 293/132 X |
| 5,271,650 | 12/1993 | Fukuhara et al. | 293/155 X |

FOREIGN PATENT DOCUMENTS

| 2912178 | 8/1985 | Germany . |
|---|---|---|
| 3928060 | 2/1991 | Germany . |
| WO88/09732 | 12/1988 | WIPO . |

*Primary Examiner*—Dean J. Kramer
*Attorney, Agent, or Firm*—Evenson, McKeown, Edwards & Lenahan

[57] ABSTRACT

A bumper assembly for a motor vehicle is disclosed which can be fastened via at least one supporting element and, by means of a screw connection, on a part fixed to the vehicle. A foam energy absorber is provided on which the at least one supporting element is mounted. The supporting element, which reaches virtually over the entire height of the energy absorber, is designed approximately in the form of an umbrella. The umbrella edge, which terminates flatly, bears on the part fixed to the vehicle and, at a distance from the umbrella edge on the underside of the supporting element, supporting webs are provided which are likewise supported on the part fixed to the vehicle.

7 Claims, 1 Drawing Sheet 5,393,111

BUMPER ASSEMBLY FOR A MOTOR VEHICLE

BACKGROUND AND SUMMARY OF THE INVENTION

This invention relates to a bumper of a motor vehicle which can be fastened on a part fixed to a vehicle, via at least one supporting element and by means of a screw connection, and has a foam energy absorber on which the at least one supporting element is mounted.

German Patent Document DE 29 12 178 C2 discloses a bumper design and support of this general type. In this arrangement, two supporting elements which are arranged at a distance one above the other and have a sharp-edged U-profile are embedded in the foam in the region in which the bumper is connected to the part fixed to the vehicle. The connecting region is relatively long and the thickness of the foam in the connecting region is very large because there is only a low possibility of energy absorption outside this region. The distance by which the bumper projects from the bodywork is thus relatively large and, in the case of high impact loading, it has to be expected that the sharp-edged supporting elements cause incisions in the compressing foam, as a result of which, after being relieved of the loading, the necessary quality of connection between the energy absorber and the supporting elements is no longer provided.

It is an object of the invention to ensure, in the case of a bumper which has a relatively small foam thickness and is supported over the length of the energy absorber on a part fixed to the vehicle, that, in the supporting region, the smallest possible reduction in energy-absorption capacity and good integration of the supporting element into the foam material, along with it being well secured against being torn out, are achieved, with the result that even forces with a high component in the transverse direction of the vehicle can be absorbed.

This object is achieved in preferred embodiments of the invention by providing a bumper assembly comprising a supporting element, a threaded connection projecting from the supporting element and serving to accommodate connecting of the supporting element to a fixed vehicle part, and a foam energy absorber mounted on the supporting element, wherein the supporting element is designed such that it is arched approximately in the form of an umbrella and reaches virtually over the entire height of the energy absorber, wherein the umbrella edge terminates relatively flatly and bears on the fixed vehicle part, and wherein supporting webs which are likewise supported on the part fixed to the vehicle project on the underside of the supporting element at a distance from the umbrella edge.

If the connecting webs are connected to one another and to the screw connection and to the umbrella edge by means of supporting walls, thus forming a honeycomb structure, then that region in the vicinity of the screw connection is additionally stiffened, while the flexibility towards the edge regions is hardly reduced, with the result that, in the event of being subjected to loading, no cracks arise in the foam material which reduce the extent to which the supporting element is secured against being torn out.

A distribution of the incident forces to be introduced and an even better integration are achieved if there are provided in the transverse direction of the bumper two supporting element portions which are connected to each other and the connection region of which is designed in an undulating manner, terminating flatly towards the nearby umbrella edge.

Other objects, advantages and novel features of the present invention will become apparent from the following detailed description of the invention when considered in conjunction with the accompanying drawings.

DETAILED DESCRIPTION OF THE DRAWINGS

Figure 1:
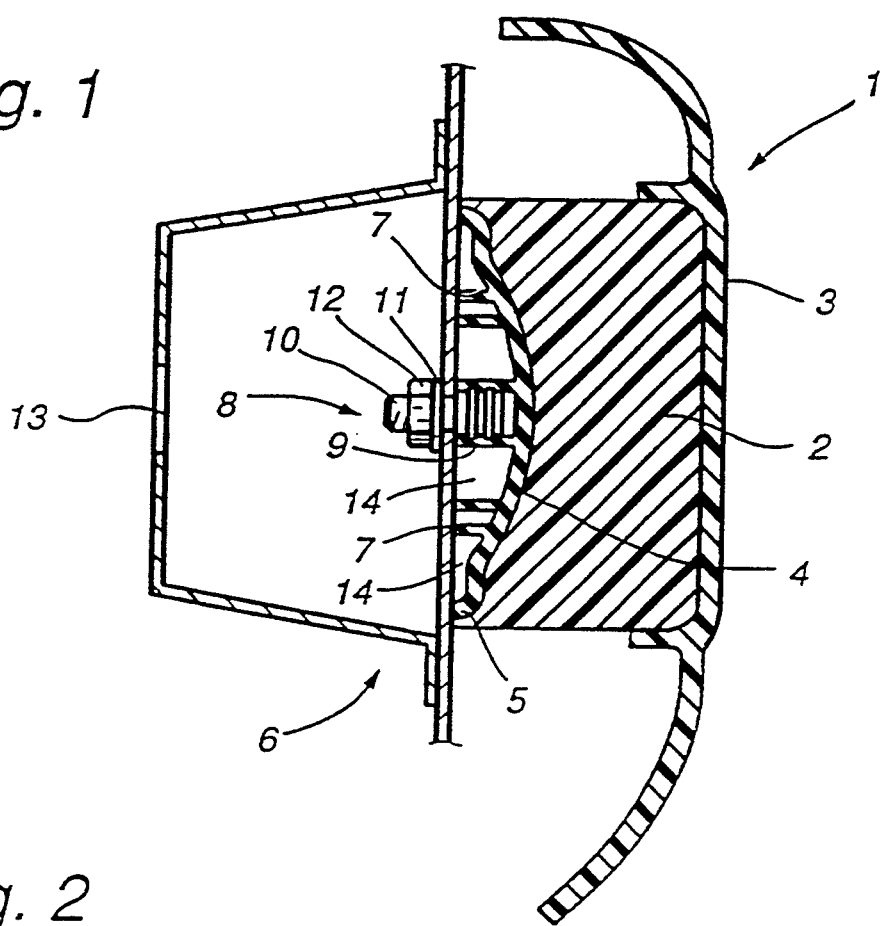
FIG. 1 is a sectional view through a bumper which is fastened by means of a supporting element on a part fixed to the vehicle constructed according to preferred embodiments of the invention.

According to FIG. 1, a bumper assembly 1 comprises an energy absorber 2 which is preferably formed from PUR foam and which is covered on the impact side by a cladding 3 and on which supporting elements 4 are mounted. The bumper assembly 1 can be produced such that the cladding 3 and the supporting element 4 are introduced into a mound and the energy absorber 2 is then foamed on. Two supporting element portions 4 are fitted together to form an umbrella-like structure which reaches virtually over the entire height of the energy absorber 2, the umbrella edge 5 bearing on a part 6 which is attached to a vehicle.

At a distance from the umbrella edge 5, there are arranged supporting webs 7 and two centrally positioned screw connections 8, the latter comprising threaded bolts 10 which are accommodated by sleeves 9 and onto which, according to FIG. 1, a nut 12 is screwed with the interposition of the shim 11, and mounting is carried out via an opening 13 provided on the rear side of the part 6 fixed to the vehicle.

Figure 2:
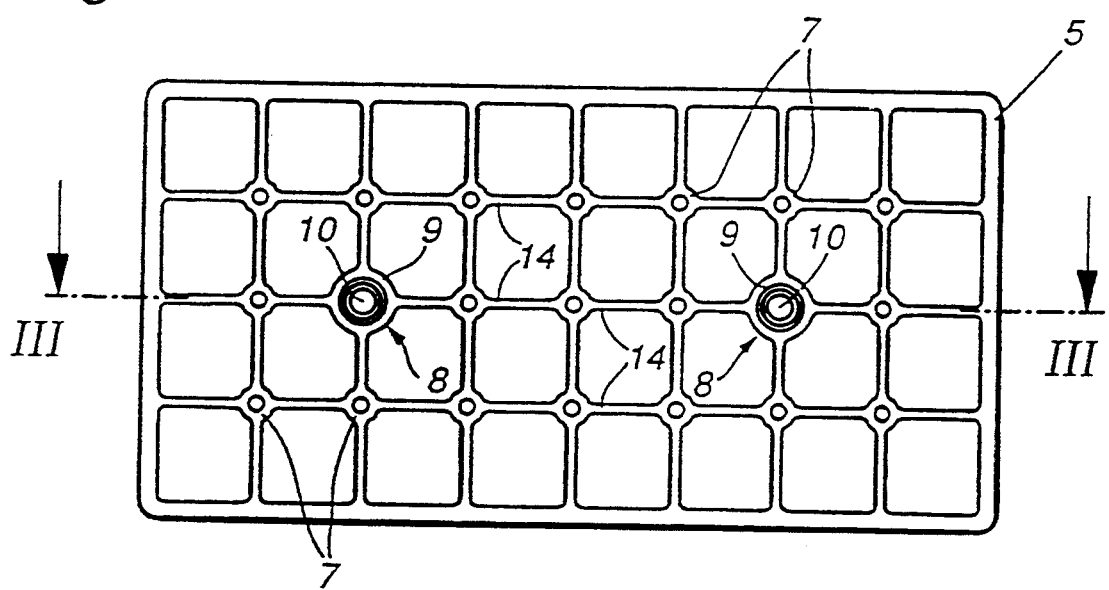
FIG. 2 shows the rear view of a supporting element according to FIG. 1.

As shown in particular in FIG. 2, the supporting webs 7 are connected to one another and to the screw connections 8 and to the umbrella edge 5 by means of supporting walls 14, this resulting in the formation of a honeycomb structure which is supported on the part 6 which is attached to a vehicle. Outside this supporting region, the energy absorber 2 bears (in a manner not shown) on the part 6 which is attached to a vehicle.

Figure 3:
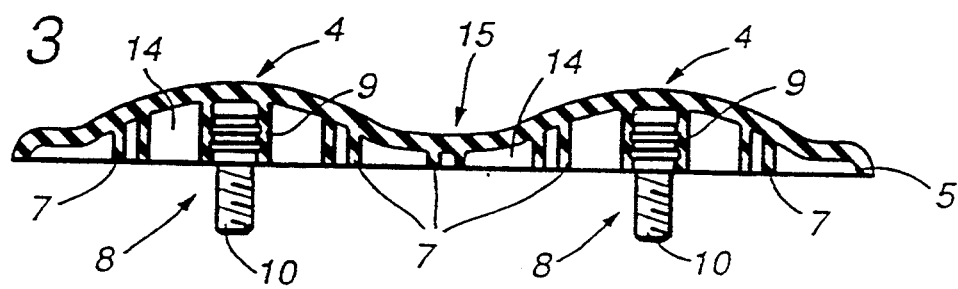
FIG. 3 shows a section along the line III—III in FIG. 2.

The connecting region 15 of the two supporting element portions 4 is, as shown in FIG. 3, designed in an undulating manner. There is a flat termination towards the umbrella edge 5 and this achieves, overall, a flexibility all round the edges which prevents crack formation in the energy absorber 2 in the event of being subjected to loading.

Although the invention has been described and illustrated in detail, it is to be clearly understood that the same is by way of illustration and example, and is not to be taken by way of limitation. The spirit and scope of the present invention are to be limited only by the terms of the appended claims.

It is claimed:

1. Bumper assembly for a motor vehicle comprising:
   a supporting element;

a threaded connection projecting from the supporting element serving to accommodate connecting of the supporting element to a fixed vehicle part, and a foam energy absorber mounted on the supporting element, wherein the supporting element is designed such that it is arched approximately in the form of an umbrella and reaches virtually over the entire height of the energy absorber, wherein the umbrella edge terminates relatively flatly and bears on the fixed vehicle part, and wherein supporting webs which are likewise supported on the part fixed to the vehicle project on the underside of the supporting element at a distance from the umbrella edge, wherein the threaded connection is disposed spaced from contact surfaces of the umbrella edge bearing on the fixed vehicle part.

2. Bumper assembly according to claim 1, wherein the supporting webs are connected to one another and to the threaded connection and to the umbrella edge by means of supporting walls to thus form a honeycomb structure.

3. Bumper assembly according to claim 2, wherein there are provided in the transverse direction of the bumper assembly two supporting element portions which are connected to each other and the connecting region of which is designed in an undulating manner, terminating flatly towards the umbrella edge.

4. Bumper assembly according to claim 1, wherein there are provided in the transverse direction of the bumper assembly two supporting element portions which are connected to each other and the connecting region of which is designed in an undulating manner, terminating flatly towards the umbrella edge.

5. Bumper assembly for a motor vehicle comprising:
a supporting element;
a threaded connection projecting from the supporting element serving to accommodate connecting of the supporting element to a fixed vehicle part,
and a foam energy absorber mounted on the supporting element, wherein the supporting element is designed such that it is arched approximately in the form of an umbrella and reaches virtually over the entire height of the energy absorber, wherein the umbrella edge terminates relatively flatly and bears on the fixed vehicle part, and wherein supporting webs which are likewise supported on the part fixed to the vehicle project on the underside of the supporting element at a distance from the umbrella edge, wherein the threaded connection is disposed spaced from contact surfaces of the umbrella edge bearing on the fixed vehicle part,
wherein the supporting webs are connected to one another and to the threaded connection and to the umbrella edge by means of supporting walls to thus form a honeycomb structure.

6. Bumper assembly according to claim 5, wherein there are provided in the transverse direction of the bumper assembly two supporting element portions which are connected to each other and the connecting region of which is designed in an undulating manner, terminating flatly towards the umbrella edge.

7. Bumper assembly for a motor vehicle comprising:
a supporting element;
a threaded connection projecting from the supporting element serving to accommodate connecting of the supporting element to a fixed vehicle part,
and a foam energy absorber mounted on the supporting element, wherein the supporting element is designed such that it is arched approximately in the form of an umbrella and reaches virtually over the entire height of the energy absorber, wherein the umbrella edge terminates relatively flatly and bears on the fixed vehicle part, and wherein supporting webs which are likewise supported on the part fixed to the vehicle project on the underside of the supporting element at a distance from the umbrella edge, wherein the supporting webs are connected to one another and to the threaded connection and to the umbrella edge by means of supporting walls to thus form a honeycomb structure.

* * * * *